United States Patent
Ayai (10) Patent No.: US 12,463,554 B2
(45) Date of Patent: Nov. 4, 2025

(54) INVERTER, PARALLEL INVERTER SYSTEM, AND METHOD OF CONTROLLING INVERTER

(71) Applicant: Sumitomo Electric Industries, Ltd., Osaka (JP)

(72) Inventor: Naoki Ayai, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 272 days.

(21) Appl. No.: 18/278,410

(22) PCT Filed: Nov. 2, 2021

(86) PCT No.: PCT/JP2021/040360
§ 371 (c)(1),
(2) Date: Aug. 23, 2023

(87) PCT Pub. No.: WO2022/185614
PCT Pub. Date: Sep. 9, 2022

(65) Prior Publication Data
US 2024/0136947 A1  Apr. 25, 2024
US 2024/0235421 A9  Jul. 11, 2024

(30) Foreign Application Priority Data
Mar. 3, 2021  (JP) .................. 2021-033734

(51) Int. Cl.
*H02M 7/493* (2007.01)
*H02J 3/24* (2006.01)
(Continued)

(52) U.S. Cl.
CPC ............. *H02M 7/493* (2013.01); *H02J 3/241* (2020.01); *H02J 3/40* (2013.01); *H02M 1/0025* (2021.05);
(Continued)

(58) Field of Classification Search
CPC .... H02J 3/24; H02J 3/241; H02J 3/381; H02J 3/40; H02J 3/46; H02J 2300/24; H02M 1/0025; H02M 7/493; H02M 7/539
See application file for complete search history.

(56) References Cited

U.S. PATENT DOCUMENTS

2015/0092462 A1    4/2015  Ohori et al.
2018/0358907 A1*  12/2018  Kato ................. H02M 7/53875
(Continued)

FOREIGN PATENT DOCUMENTS

JP    2005-229701 A    8/2005
JP    2010-161901 A    7/2010
(Continued)

*Primary Examiner* — Fred E Finch, III
(74) *Attorney, Agent, or Firm* — XSENSUS LLP (57) ABSTRACT

An inverter according to the present disclosure is an inverter connected in parallel to an alternating-current circuit to which an alternating-current power source is connected, and configured to provide an independent output to the alternating-current circuit. The inverter includes a power converter configured to convert a direct-current power into an alternating-current power to supply power to the alternating-current circuit, a voltage sensor configured to detect an alternating-current voltage of the alternating-current circuit, and a controller configured to control the power converter. The controller is configured to add frequency feedback processing to an operation of calculating a frequency detection value in a phase locked loop to be executed based on the alternating-current voltage, the frequency feedback processing being processing of adding a frequency correction value obtained by performing a proportional integral operation on a comparison result between a previous value of the frequency detection value and a frequency reference value.

7 Claims, 8 Drawing Sheets

(51) Int. Cl.
  *H02J 3/40*   (2006.01)
  *H02J 3/46*   (2006.01)
  *H02M 1/00*   (2006.01)
  *H02J 3/38*   (2006.01)
  *H02M 7/539*   (2006.01)

(52) U.S. Cl.
  CPC .............. *H02J 3/381* (2013.01); *H02J 3/46* (2013.01); *H02J 2300/24* (2020.01); *H02M 7/539* (2013.01)

(56) References Cited

U.S. PATENT DOCUMENTS

2021/0265906 A1* 8/2021 Summanen .............. H02M 1/00
2021/0288592 A1* 9/2021 Kouno ................... G01R 23/15

FOREIGN PATENT DOCUMENTS

JP    2015-100224 A    5/2015
JP    2017-225214 A    12/2017

\* cited by examiner

INVERTER, PARALLEL INVERTER SYSTEM, AND METHOD OF CONTROLLING INVERTER

CROSS-REFERENCE TO RELATED APPLICATIONS

The present application is based on PCT filing PCT/JP2021/040360, filed Nov. 2, 2021, which claims priority to Japanese Patent Application No. 2021-033734, filed on Mar. 3, 2021, the entire contents of each are incorporated herein by reference.

TECHNICAL FIELD

The present disclosure relates to an inverter, a parallel inverter system, and a method of controlling an inverter.

BACKGROUND

In recent years, power generation devices based on renewable energy represented by photovoltaic generation have become widespread in electric power companies and small-scale consumers. Such a power generation device is grid-interconnected with a commercial power grid and operated in parallel. In addition, in order to increase self-power generation capacity without depending on a commercial power grid, independent outputs of inverters (power conversion devices) are connected in parallel to each other to supply alternating-current power to a load (see, for example, PTL 1).

PRIOR ART DOCUMENT

Patent Literature

PTL 1: Japanese Unexamined Patent Application Publication No. 2005-229701

SUMMARY OF THE INVENTION

The present disclosure includes the following invention. However, the invention is defined by the appended claims.
(Inverter)
An inverter according to the present disclosure is an inverter connected in parallel to an alternating-current circuit to which an alternating-current power source is connected, and configured to provide an independent output to the alternating-current circuit. The inverter includes a power converter configured to convert a direct-current power into an alternating-current power to supply power to the alternating-current circuit; a voltage sensor configured to detect an alternating-current voltage of the alternating-current circuit; and a controller configured to control the power converter. The controller is configured to add frequency feedback processing to an operation of calculating a frequency detection value in a phase locked loop to be executed based on the alternating-current voltage, the frequency feedback processing being processing of adding a frequency correction value obtained by performing a proportional integral operation on a comparison result between a previous value of the frequency detection value and a frequency reference value.
(Parallel Inverter System)
A parallel inverter system includes a first inverter configured to provide an independent output to an alternating-current circuit, and a second inverter connected in parallel to the alternating-current circuit together with the first inverter and configured to provide an independent output to the alternating-current circuit. Each of the first inverter and the second inverter includes a power converter configured to convert a direct-current power into an alternating-current power to supply power to the alternating-current circuit; a voltage sensor configured to detect an alternating-current voltage of the alternating-current circuit; and a controller configured to control the power converter. The controller is configured to add frequency feedback processing to an operation of calculating a frequency detection value in a phase locked loop to be executed based on the alternating-current voltage, the frequency feedback processing being processing of adding a frequency correction value obtained by performing a proportional integral operation on a comparison result between a previous value of the frequency detection value and a frequency reference value.
(A Method of Controlling Inverter)
From a method perspective, a method of controlling an inverter is a method of controlling an inverter connected in parallel to an alternating-current circuit to which an alternating-current power source is connected, and configured to provide an independent output to the alternating-current circuit. The method includes converting, by a power converter, a direct-current power into an alternating-current power to supply power to the alternating-current circuit. A controller configured to control the power converter is configured to add frequency feedback processing to an operation of calculating a frequency detection value in a phase locked loop to be executed based on an alternating-current voltage of the alternating-current circuit, the frequency feedback processing being processing of adding a frequency correction value obtained by performing a proportional integral operation on a comparison result between a previous value of the frequency detection value and a frequency reference value.

BRIEF DESCRIPTION OF THE DRAWINGS

Part (a) of FIG. 8 is a graph showing an example of the relationship between the output current I of the inverter and the phase difference φ when the inverter having the phase locked loop with frequency feedback shown in FIG. 2 is operated in parallel.

Part (b) of FIG. 8 is a vector diagram showing the relationship between the equivalent induced electromotive force E, the phase difference φ, and the alternating-current voltage V.

DETAILED DESCRIPTION

Problems to be Solved by Present Disclosure

In order to operate a plurality of inverters providing independent outputs in parallel, it is necessary to match phases with each other, and for this purpose, a phase locked loop (PLL) is used. The phase locked loop used in the grid interconnection can perform phase locking by setting vq obtained by dq transformation (park transformation) to 0 using an alternating-current voltage as a reference signal. However, it has been found that when a phase locked loop is used in the inverter operated in parallel and providing independent outputs, the frequency does not converge to a constant value but continues to change and becomes uncontrollable over time.

In view of such problems, it is an object of the present disclosure to stabilize parallel operation of inverters providing independent outputs to an alternating-current circuit.

Advantageous Effects of Present Disclosure

According to the present disclosure, parallel operation of inverters providing independent outputs to an alternating-current circuit can be stabilized.

DESCRIPTION OF EMBODIMENTS OF PRESENT DISCLOSURE

Embodiments of the present disclosure include at least the following as the point.

(1) An inverter according to the present disclosure is an inverter connected in parallel to an alternating-current circuit to which an alternating-current power source is connected, and configured to provide an independent output to the alternating-current circuit. The inverter includes a power converter configured to convert a direct-current power into an alternating-current power to supply power to the alternating-current circuit; a voltage sensor configured to detect an alternating-current voltage of the alternating-current circuit; and a controller configured to control the power converter. The controller is configured to add frequency feedback processing to an operation of calculating a frequency detection value in a phase locked loop to be executed based on the alternating-current voltage, the frequency feedback processing being processing of adding a frequency correction value obtained by performing a proportional integral operation on a comparison result between a previous value of the frequency detection value and a frequency reference value.

In such an inverter, the frequency of the independent output asymptotically approaches the target value and converges. Therefore, when a plurality of such inverters are connected in parallel or connected in parallel with another alternating-current power source, a stable parallel operation can be performed.

(2) In the inverter according to (1), the controller is configured to perform, if the frequency correction value is a second frequency correction value, a first operation of obtaining a first frequency correction value, based on a deviation between a voltage phase based on a detected output of the voltage sensor and an internal phase in the phase locked loop, a second operation of obtaining anew frequency detection value by adding the first frequency correction value and the second frequency correction value to the frequency reference value, and a third operation of generating a control signal for controlling an output of the power converter, based on the new frequency detection value. In this case, in particular, by performing the second operation, it is possible to suppress a state in which the frequency of the independent output does not converge.

(3) In the inverter according to (2), the third operation includes obtaining a voltage command value, based on the new frequency detection value; and obtaining a voltage correction value by performing a proportional operation on a deviation between the voltage command value and the alternating-current voltage. In this case, by performing the proportional operation instead of the proportional integral operation, it is possible to suppress the cross-current even if there is a difference in the value detected as the alternating-current voltage between the alternating-current power source and another alternating-current power source.

(4) In the inverter according to (2) or (3), the internal phase has a phase difference with respect to a phase of the alternating-current voltage changing according to an output current of the power converter. The phase difference is proportional to the output current, and as the output current increases, the phase difference also increases. This is similar to the relationship between the output current and the internal phase angle of the synchronous generator. That is, an inverter in which frequency feedback processing is added to a phase locked loop is operated as a kind of virtual synchronous generator. Therefore, the inverter can also be operated in parallel with the synchronous generator.

(5) In the inverter according to any one of (1) to (4), the power converter is further capable of converting an alternating-current power into a direct-current power. The controller is configured to control the power converter such that the power converter converts an alternating-current power of the alternating-current power source into a direct-current power to charge a direct-current voltage source connected to a direct-current side of the power converter. When an alternating-current power source (current source) outputting a current synchronized with the voltage of the alternating-current circuit, as with a grid interconnection type inverter using photovoltaic generation as a power source, is connected to the alternating-current circuit, surplus power of power consumption in the load may be converted (AC→DC) by the inverter providing independent outputs to charge a direct-current voltage source (including a storage battery).

(6) Also, a parallel inverter system includes a first inverter configured to provide an independent output to an alternating-current circuit, and a second inverter connected in parallel to the alternating-current circuit together with the first inverter and configured to provide an independent output to the alternating-current circuit. Each of the first inverter and the second inverter includes a power converter configured to convert a direct-current power into an alternating-current power to supply power to the alternating-current circuit; a voltage sensor configured to detect an alternating-current voltage of the alternating-current circuit; and a controller configured to control the power converter. The controller is configured to add frequency feedback processing to an operation of calculating a frequency detection value in a phase locked loop to be executed based on the alternating-current voltage, the frequency feedback processing being processing of adding a frequency correction value obtained by performing a proportional integral operation on a comparison result between a previous value of the frequency detection value and a frequency reference value.

In each inverter in such a parallel inverter system, the frequency of the independent output asymptotically converges to the target value. Therefore, the parallel inverter system can perform a stable parallel operation.

(7) From a method perspective, a method of controlling an inverter is a method of controlling an inverter connected in parallel to an alternating-current circuit to which an alternating-current power source is connected, and configured to provide an independent output to the alternating-current circuit. The method includes converting, by a power converter, a direct-current power into an alternating-current power to supply power to the alternating-current circuit. A controller configured to control the power converter is configured to add frequency feedback processing to an operation of calculating a frequency detection value in a phase locked loop to be executed based on an alternating-current voltage of the alternating-current circuit, the frequency feedback processing being processing of adding a frequency correction value obtained by performing a proportional integral operation on a comparison result between a previous value of the frequency detection value and a frequency reference value.

According to such a method of controlling an inverter, the frequency of the independent output gradually approaches and converges to the target value. Therefore, when a plurality of such inverters are connected in parallel or connected in parallel with another alternating-current power source, a stable parallel operation can be performed.

Details of Embodiments of Present Disclosure

Hereinafter, an inverter, a parallel inverter system, and a method of controlling an inverter of the present disclosure will be described with reference to the drawings.

<<Parallel inverter System>>

Figure 1:
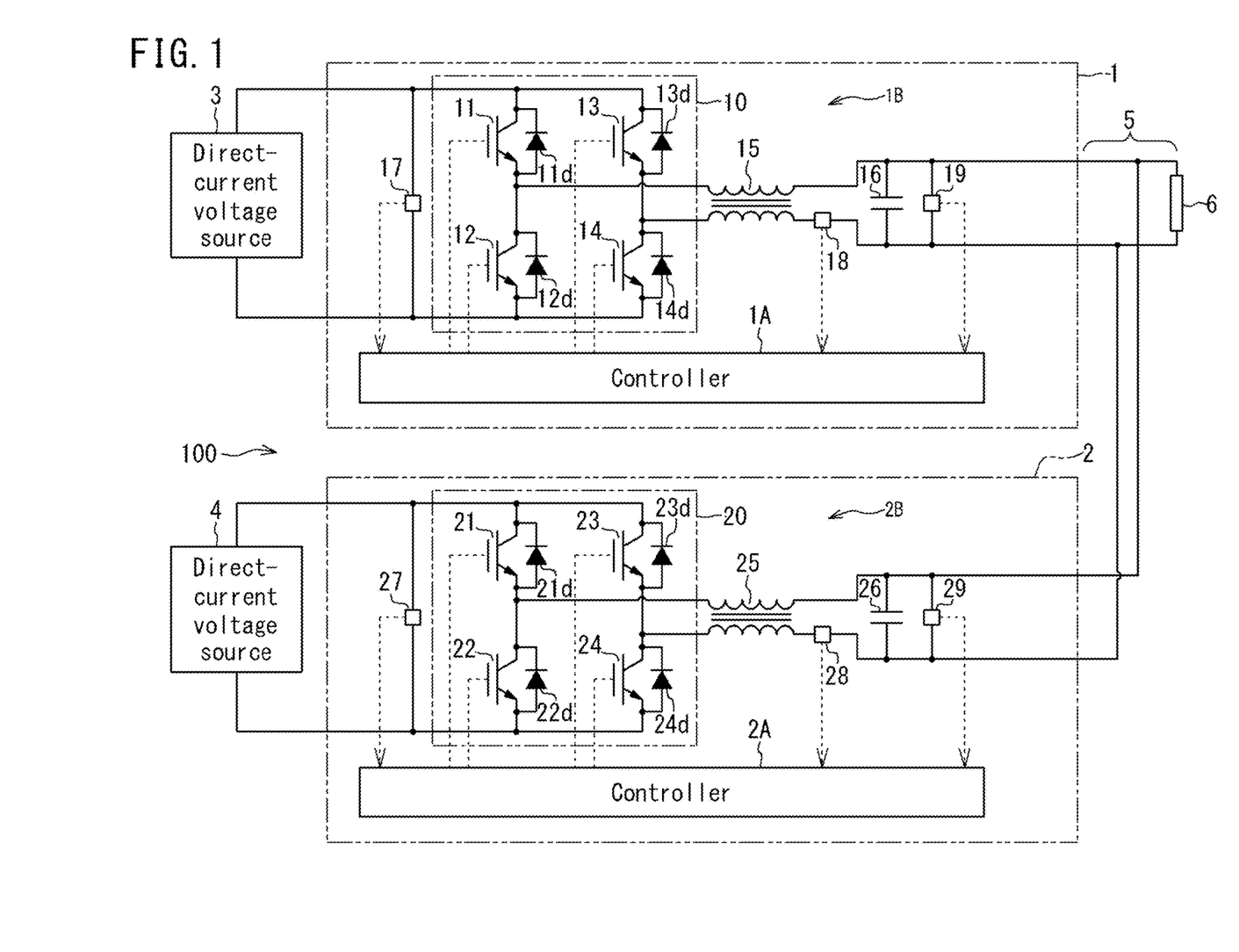
FIG. 1 is a connection diagram showing an example of a parallel inverter system in which two self-operating inverters are connected in parallel to an alternating-current circuit.

FIG. 1 is a connection diagram showing an example of a parallel inverter system 100 in which two self-operating inverters 1 and 2 are connected in parallel to an alternating-current circuit 5. Although each of the inverters 1 and 2 can be operated by grid interconnection with a commercial power grid, the present disclosure shows only a state of self-operating operation. The two inverters are a minimum configuration example of "plural" inverters, and three or more inverters may be provided.

In FIG. 1, a direct-current voltage source 3 is connected to first inverter 1. Direct-current voltage source 3 may be a power source itself such as a photovoltaic generation panel or a storage battery, or may be a circuit in which a DC/DC converter is connected to a power source. Similarly, a direct-current voltage source 4 is connected to second inverter 2. First inverter 1 and second inverter 2 are connected in parallel to alternating-current circuit 5. A load (AC load) 6 is connected to alternating-current circuit 5.

First inverter 1 includes a controller 1A and a power converter 1B. Power converter 1B includes a full-bridge circuit 10 connected to direct-current voltage source 3, an alternating-current reactor 15 provided on two lines on the alternating-current side of full-bridge circuit 10, an alternating-current capacitor 16, a voltage sensor 17, a current sensor 18, and a voltage sensor 19, which are connected as shown in the drawing.

Full-bridge circuit 10 includes switching elements 11, 12, 13, and 14 and diodes 11d, 12d, 13d, and 14d connected in anti-parallel to the switching elements. Each of illustrated switching elements 11, 12, 13, and 14 is an insulated gate bipolar transistor (IGBT), but a metal-oxide-semiconductor field effect transistor (MOS-FET) may be used instead.

Full-bridge circuit 10 is connected to the both ends of direct-current voltage source 3. Voltage sensor 17 detects a direct-current voltage input from direct-current voltage source 3 to full-bridge circuit 10 and sends a detected output to controller 1A. Current sensor 18 detects a current flowing through alternating-current reactor 15 and sends a detected output to controller 1A. Voltage sensor 19 detects the alternating-current voltage output to alternating-current circuit 5 and sends the detected output to controller 1A.

Inverter 1 configured as described above converts direct-current power input from direct-current voltage source 3 into alternating-current power subjected to voltage control by full-bridge circuit 10 subjected to pulse width modulation (PWM) control during self-operating operation. High-frequency ripples included in the alternating-current waveform are suppressed by alternating-current reactor 15 and alternating-current capacitor 16. The alternating-current output of inverter 1 is provided to alternating-current circuit 5 and supplied to load 6.

Similarly, second inverter 2 includes a controller 2A and a power converter 2B. Power converter 2B includes a full-bridge circuit 20 connected to direct-current voltage source 4, an alternating-current reactor 25 provided on two lines on the alternating-current side of full-bridge circuit 20, an alternating-current capacitor 26, a voltage sensor 27, a current sensor 28, and a voltage sensor 29, which are connected as shown in the drawing.

Full-bridge circuit 20 includes switching elements 21, 22, 23, and 24, and diodes 21d, 22d. 23d, and 24d connected in anti-parallel to the switching elements.

Full-bridge circuit 20 is connected to the both ends of direct-current voltage source 4. Voltage sensor 27 detects a direct-current voltage input from direct-current voltage source 4 to full-bridge circuit 20, and sends a detected output to controller 2A. Current sensor 28 detects a current flowing through alternating-current reactor 25 and sends a detected output to controller 2A. Voltage sensor 29 detects the alternating-current voltage output to alternating-current circuit 5 and sends the detected output to controller 2A.

Inverter 2 configured as described above converts the direct-current power input from direct-current voltage source 4 into the voltage-controlled alternating-current power by PWM-controlled full-bridge circuit 20 during the self-operating operation. High-frequency ripples included in the alternating-current waveform are suppressed by alternating-current reactor 25 and alternating-current capacitor 26. The alternating-current output of inverter 2 is provided to alternating-current circuit 5 and supplied to load 6.

Controllers 1A and 2A in first inverter 1 and second inverter 2 each include a computer, and the computer executes software (computer program) to implement a required control function. The software is stored in a memory device (not shown) of the controller.

<<Function of Controller>>

Figure 2:
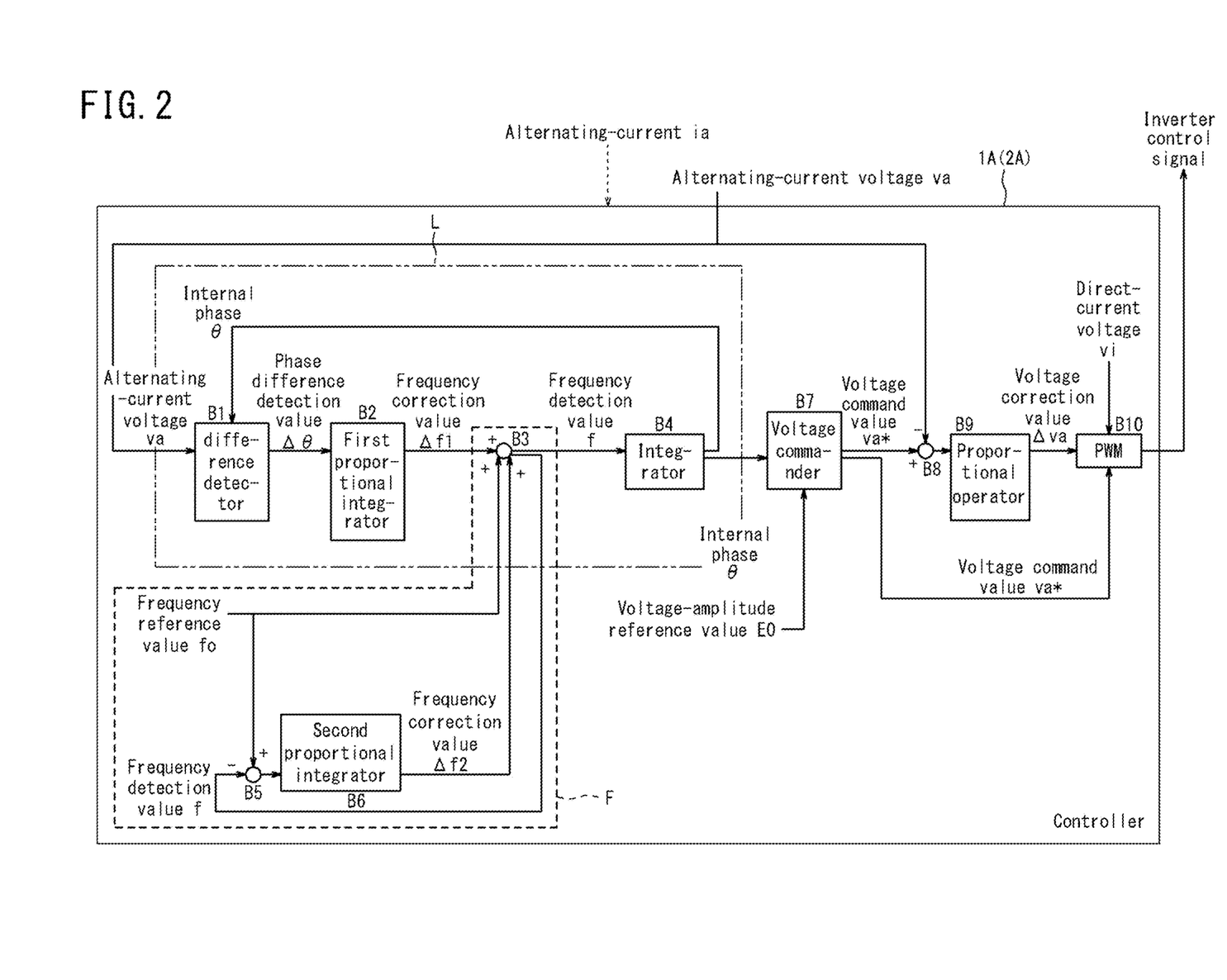
FIG. 2 is a control block diagram for voltage control in a controller.
Figure 3:
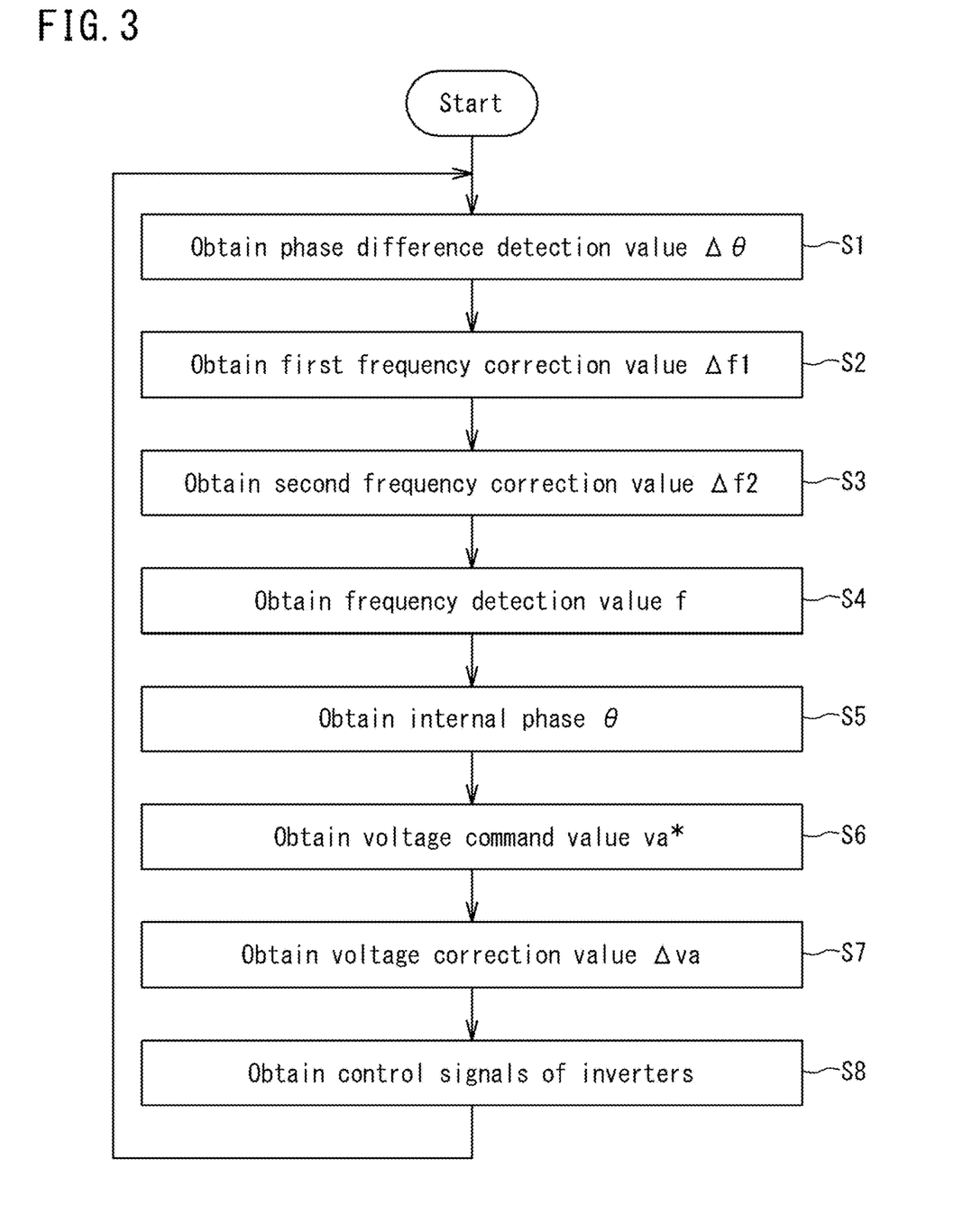
FIG. 3 is a flowchart representing the control block diagram of FIG. 2.

Next, the function of controller 1A (the same applies to the function of controller 2A, which is hereinafter simply referred to as "controller") will be described. FIG. 2 is a control block diagram for voltage control in a controller. Note that this figure is the simplest example that does not include a current control loop for the sake of simplicity. FIG. 3 is a flowchart representing the control block diagram of FIG. 2.

Hereinafter, FIG. 2 and FIG. 3 will be described in association with each other. First, in FIG. 3, the controller obtains a phase difference detection value $\Delta\theta$ (step S1). In FIG. 2, an alternating-current voltage va and an internal phase (previous value) θ are input to a phase difference detector B1, and a phase difference detection value Δθ is obtained.

Next, in FIG. 3, the controller obtains a first frequency correction value Δf1 (step S2). In FIG. 2, the phase difference detection value Δθ becomes the frequency correction value Δf1 via a first proportional integrator B2.

Next, in FIG. 3, the controller obtains a second frequency correction value Δf2 (step S3). In FIG. 2, an adder B5 compares the frequency reference value fo with the previous value of the frequency detection value f, and the difference therebetween becomes the frequency correction value Δf2 via a second proportional integrator B6.

Next, in FIG. 3, the controller obtains a frequency detection value f (step S4). In FIG. 2, the frequency correction value Δf1, the frequency correction value Δf2, and the frequency reference value fo are added to each other by an adder B3 to obtain a new frequency detection value f. First, when a new frequency detection value f is determined, the frequency detection value f of the previous value is used.

Next, in FIG. 3, the controller obtains an internal phase θ (step S5). In FIG. 2, the frequency detection value f becomes the internal phase θ via an integrator B4. The internal phase θ is an output of a phase locked loop L, and a frequency feedback loop F is incorporated in phase locked loop L as an in-loop loop.

Next, in FIG. 3, the controller obtains the voltage command value va* (step S6). In FIG. 2, a voltage commander B7 outputs the voltage command value va based on the internal phase θ and the voltage-amplitude reference value E0.

Next, in FIG. 3, the controller obtains a voltage correction value Δva (step S7). In FIG. 2, the voltage command value va* and the alternating-current voltage va are compared by an adder B8 and are subjected to proportional processing by a proportional operator B9 to become the voltage correction value Δva. In the operation of obtaining the voltage correction value Δva, the alternating-current ia may be used.

If proportional integral control is used for the operation of the voltage correction value Δva, the reactive power due to the cross-current flowing between the two inverters increases as the deviation of the alternating-current voltage va of the two inverters increases. As a result, a deviation, a DC component, and a phase difference occur in the output current. However, if proportional control (proportional operator B9) is used, even if there is a deviation of about 1% in the alternating-current voltage va between the two inverters, the cross-current hardly flows and the outputs of the two inverters become uniform.

In FIG. 3, the controller obtains the control signals of the inverters (step S8). In FIG. 2, a pulse-width modulated inverter control signal is generated by a PWM signal generator B10 based on the voltage command value va and the voltage correction value Δva, and a gate drive signal of the inverter is obtained based on the inverter control signal. PWM signal generator B10 receives the direct-current voltage vi as well.

The processing shown in the flowchart of FIG. 3 is repeatedly executed during the self-operating operation of inverters 1 and 2. In FIG. 2, phase difference detector B1, first proportional integrator B2, adder B3 and integrator B4 form phase locked loop L. Also, adder B3, adder B5, and second proportional integrator B6 form frequency feedback loop F. When the inverter performs the grid interconnection operation instead of the self-operating operation, frequency feedback loop F may not be used.

<<Verification>>

First, verification will be performed by simulation from a reference example of control not using the frequency feedback loop as described above.

Reference Example 1

Figure 4:
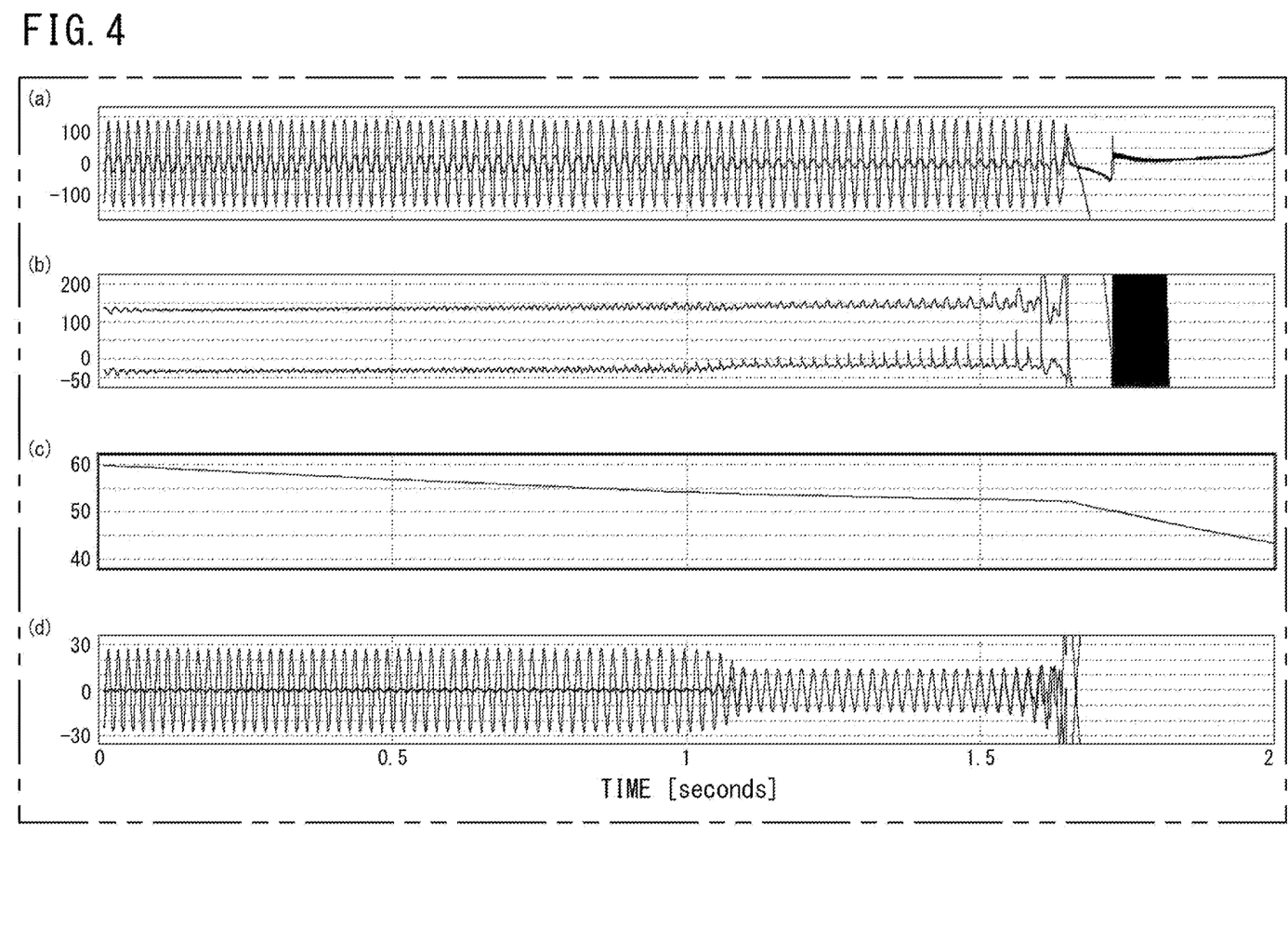
FIG. 4 shows simulation results in the case where two inverters, the first inverter and the second inverter, are operated in parallel with independent outputs by the similar control as that in the case where the grid interconnection operation is performed.

FIG. 4 shows simulation results in the case where two inverters, the first inverter and the second inverter, are operated in parallel with independent outputs by the similar control as in the case where the grid interconnection operation is performed. The horizontal axis in parts (a), (b), (c), and (d) of FIG. 4 is common and represents time (0 to 2 seconds). The numerical values on the vertical axis represent voltage, current, or frequency. In this control, the first inverter is operated first, and the operation of the second inverter is started after one second.

Part (a) of FIG. 4 is a waveform diagram in which the alternating-current voltage va and the alternating-current output from the first inverter are overlapped. The larger amplitude is the alternating-current voltage va, and the smaller amplitude is the alternating-current. Part (b) of FIG. 4 is a waveform diagram of two phase voltages vd (upper) and vq (lower) after dq transformation. Part (c) of FIG. 4 is the output frequency of the phase locked loop. Part (d) of FIG. 4 is the output current of the first inverter and the second inverter. From 0 to about 1.1 seconds, the larger amplitude is the first inverter, and the smaller amplitude is the second inverter. From about 1.1 seconds to about 1.5 seconds, both of the output currents overlap each other.

As shown in part (d) of FIG. 4, immediately after the output of the second inverter is started, the two inverters equally share the output current and almost no cross-current is generated. However, as shown in part (b) of FIG. 4, the voltage vq does not become 0 but remains near-20 V. As shown in part (c) of FIG. 4, the frequency continued to decrease from the initial value and became uncontrollable after 1.5 seconds. When the grid voltage is present, the phase of the alternating-current voltage input to the phase locked loop is constant regardless of the internal frequency of the phase locked loop. Therefore, the voltage vq obtained by dq transformation can be used as a phase comparator. However, since the phase of the alternating-current voltage changes according to the internal frequency in the independent output, the frequency does not converge when the alternating-current voltage is set to the reference phase.

Reference Example 2

Figure 5:
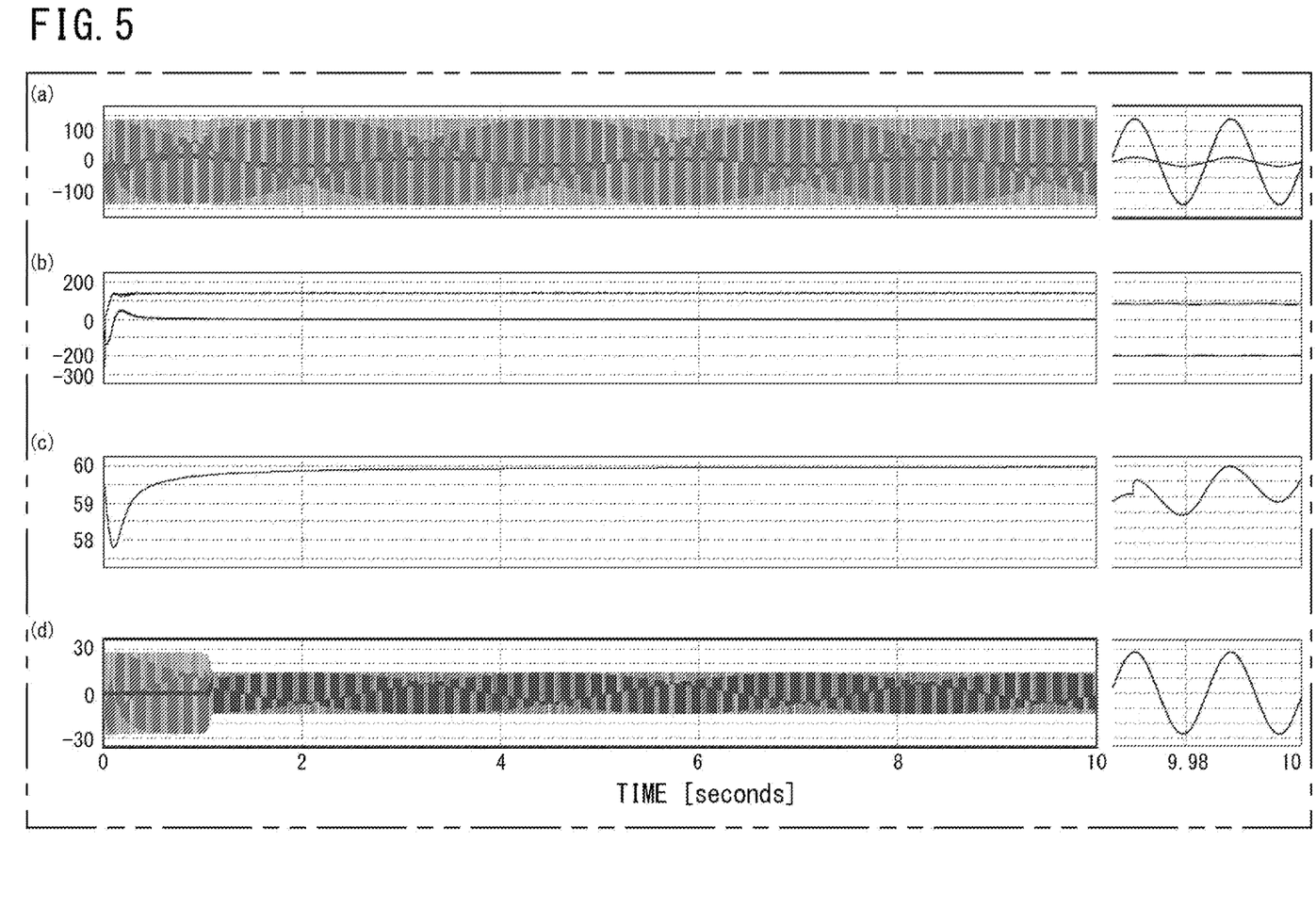
FIG. 5 shows simulation results when two inverters, the first inverter and the second inverter, are operated in parallel with independent outputs using a reference voltage signal whose frequencies are fixed to 60 Hz.

FIG. 5 shows simulation results when two inverters, the first inverter and the second inverter, are operated in parallel with independent outputs using a reference voltage signal whose frequencies are fixed to 60 Hz. The horizontal axis in parts (a), (b), (c), and (d) of FIG. 5 is common and represents time (0 to 10 seconds). The numerical values on the vertical axis represent voltage, current, or frequency. In the right end of the figure, the horizontal axis (time axis) of each of parts (a), (b), (c), and (d) of FIG. 5 immediately before 10 seconds is enlarged, and the vertical axis of each of parts (c) and (d) is also enlarged.

Part (a) of FIG. 5 is a waveform diagram in which the alternating-current voltage va and the alternating-current output from the first inverter are overlapped. The larger amplitude is the alternating-current voltage va, and the amplitude oscillating around 0 is the alternating-current. Part (b) of FIG. 5 is a waveform diagram of two phase voltages vd (upper) and vq (lower) after dq transformation.

Part (c) of FIG. 5 is the output frequency of the phase locked loop. Part (d) of FIG. 5 is the output current of the first inverter and the second inverter. The operation of the second inverter is started one second later than that of the first inverter.

According to part (b) of FIG. 5, the voltage Vq becomes 0, and the output frequency of the phase locked loop converges to the 60 Hz as shown in part (c) of FIG. 5. However, this control requires a signal line for sharing a reference voltage signal common to the two inverters. This causes the signal line to be easily affected by noise.

(Control Based on Control Block Diagram of FIG. 2)

Figure 6:
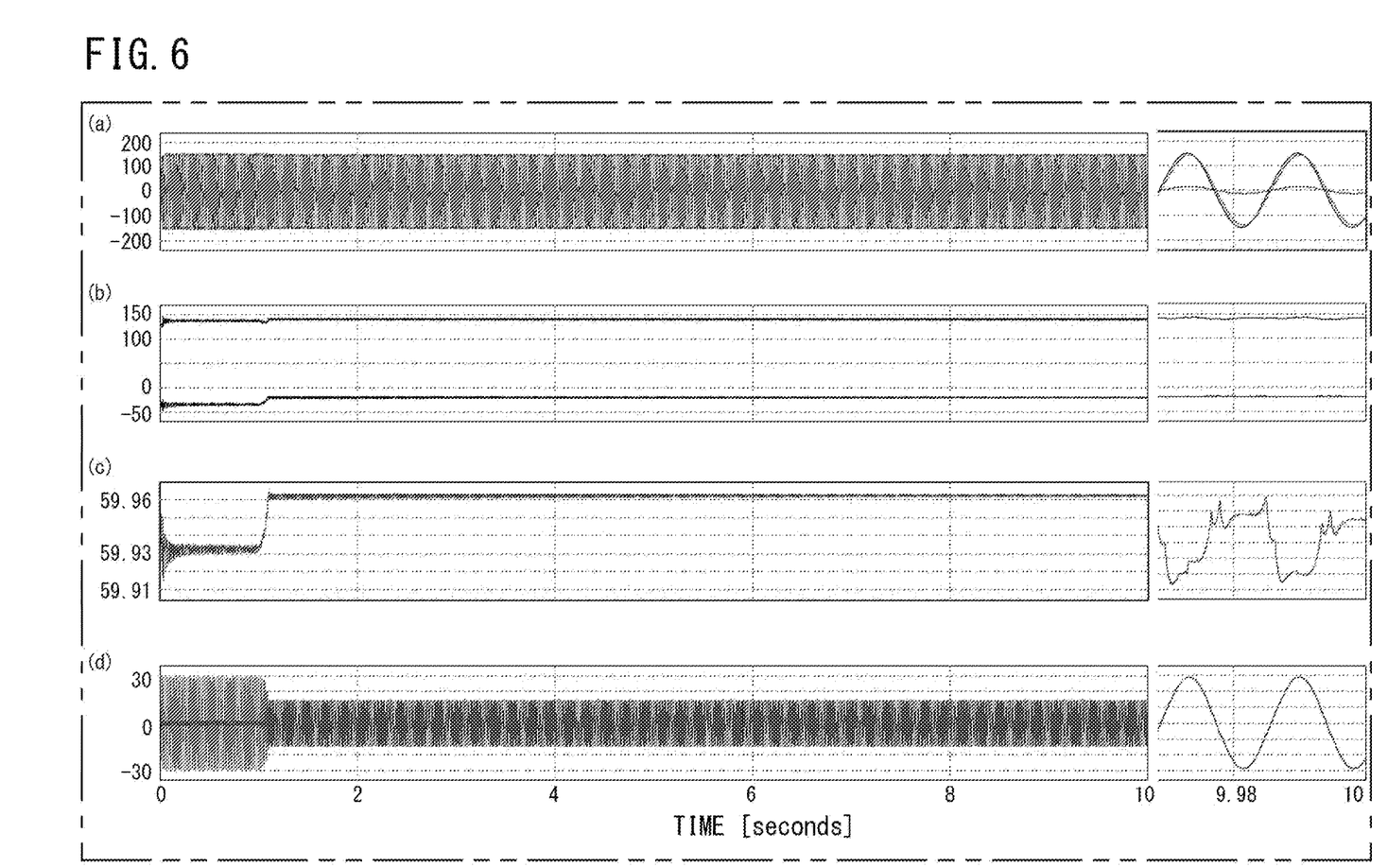
FIG. 6 shows simulation results when control based on the control block diagram of FIG. 2 is performed.

FIG. 6 is simulation results when control based on the control block diagram of FIG. 2 is performed. The horizontal axis in parts (a), (b), (c), and (d) of FIG. 6 is common and represents time (0 to 10 seconds). The numerical values on the vertical axis represent voltage, current, or frequency. In the right end of the figure, the horizontal axis (time axis) of each of parts (a), (b). (c), and (d) of FIG. 6 immediately before 10 seconds is enlarged, and the vertical axis of each of parts (c) and (d) of FIG. 6 is also enlarged. The proportional gain of second proportional integrator B6 in frequency feedback loop F was set to 0.2 and the integration time constant was set to 0.01 second.

Part (a) of FIG. 6 is a waveform diagram in which the alternating-current voltage va and the alternating-current output from the first inverter are overlapped. The larger amplitude is the alternating-current voltage va, and the amplitude oscillating around 0 is the alternating-current. Part (b) of FIG. 6 is a waveform diagram of two phase voltages vd (upper) and vq (lower) after dq transformation. Part (c) of FIG. 6 is the output frequency of the phase locked loop. Part (d) of FIG. 6 is the output current of the first inverter and the second inverter. The operation of the second inverter is started one second later than that of the first inverter.

According to FIG. 6, as shown in part (b) of FIG. 6, the voltage vq does not become 0 but converges to a negative constant value. As shown in part (c) of FIG. 6, the frequency of phase locked loop L substantially converges to a constant value as a target. Further, as shown in part (d) of FIG. 6, the output current after the operation of the second inverter is started is equally shared by the two inverters, the power factor is 1, and no DC component is generated. An uncontrollable situation does not occur, and the frequency is stable. As described above, since frequency feedback loop F is introduced into the frequency control of phase locked loop L, the parallel operation of the inverters providing the independent output to the alternating-current circuit may be stabilized.

<<Parallel Operation with Power Generator>>

Figure 8:
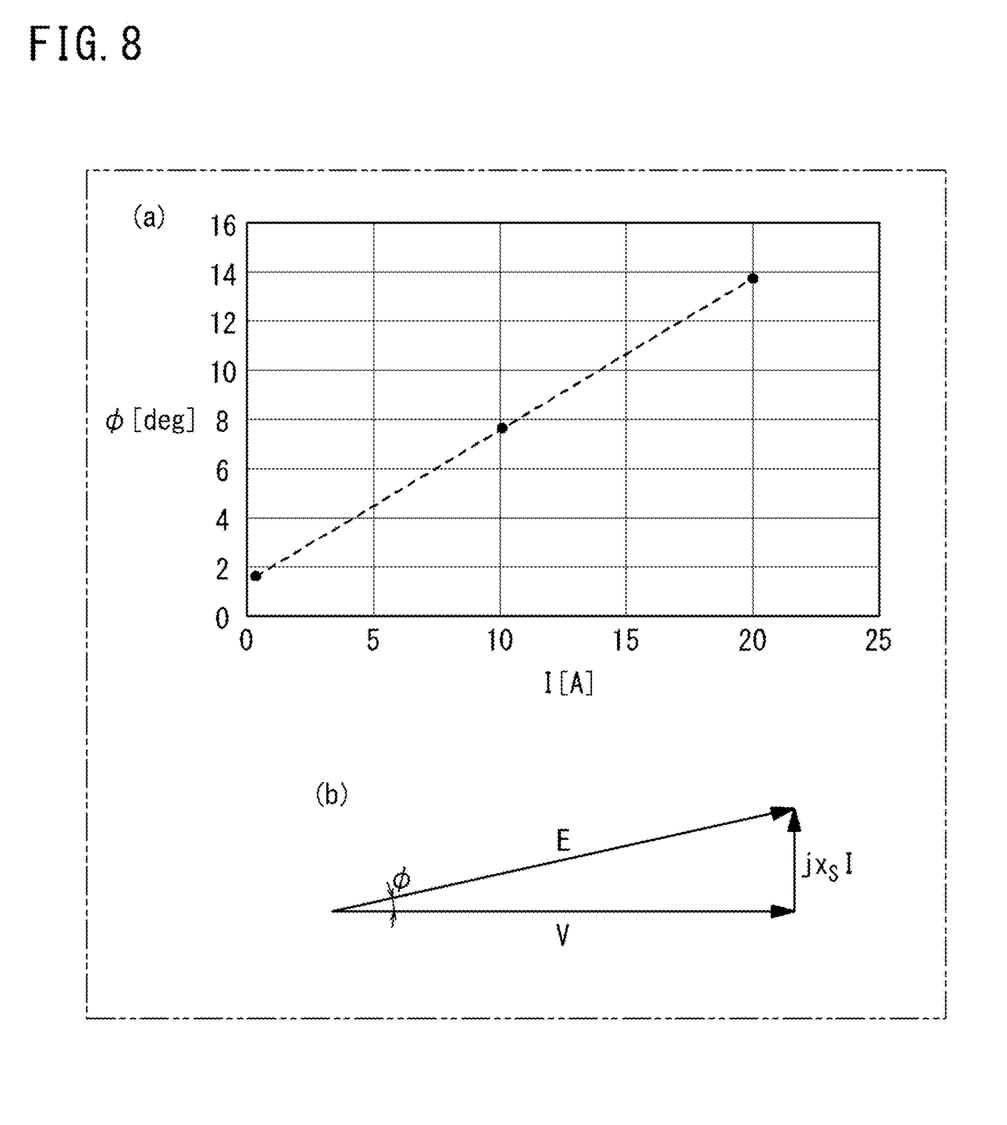

Part (a) of FIG. 8 is a graph showing an example of the relationship between the output current I of the inverter (power converter) and the internal phase difference φ when the inverter having the phase locked loop with frequency feedback shown in FIG. 2 is operated in parallel. The phase difference φ is proportional to the output current I, and as the output current I increases, the phase difference φ also increases. This is similar to the relationship between the output current and the internal phase angle of the synchronous generator.

Part (b) of FIG. 8 is a vector diagram showing the relationship between the equivalent induced electromotive force E, the phase difference 9, and the alternating-current voltage V. Assuming that the inverter is a synchronous generator having a synchronous reactance $x_s$, the phase difference φ has the following relationship when sin φ≈φ:

φ≈($jx_s$I)/E. That is, an inverter in which frequency feedback processing is added to a phase locked loop is operated as a kind of virtual synchronous generator (VSG). Therefore, the inverter can also be operated in parallel with the synchronous generator.

Figure 7:
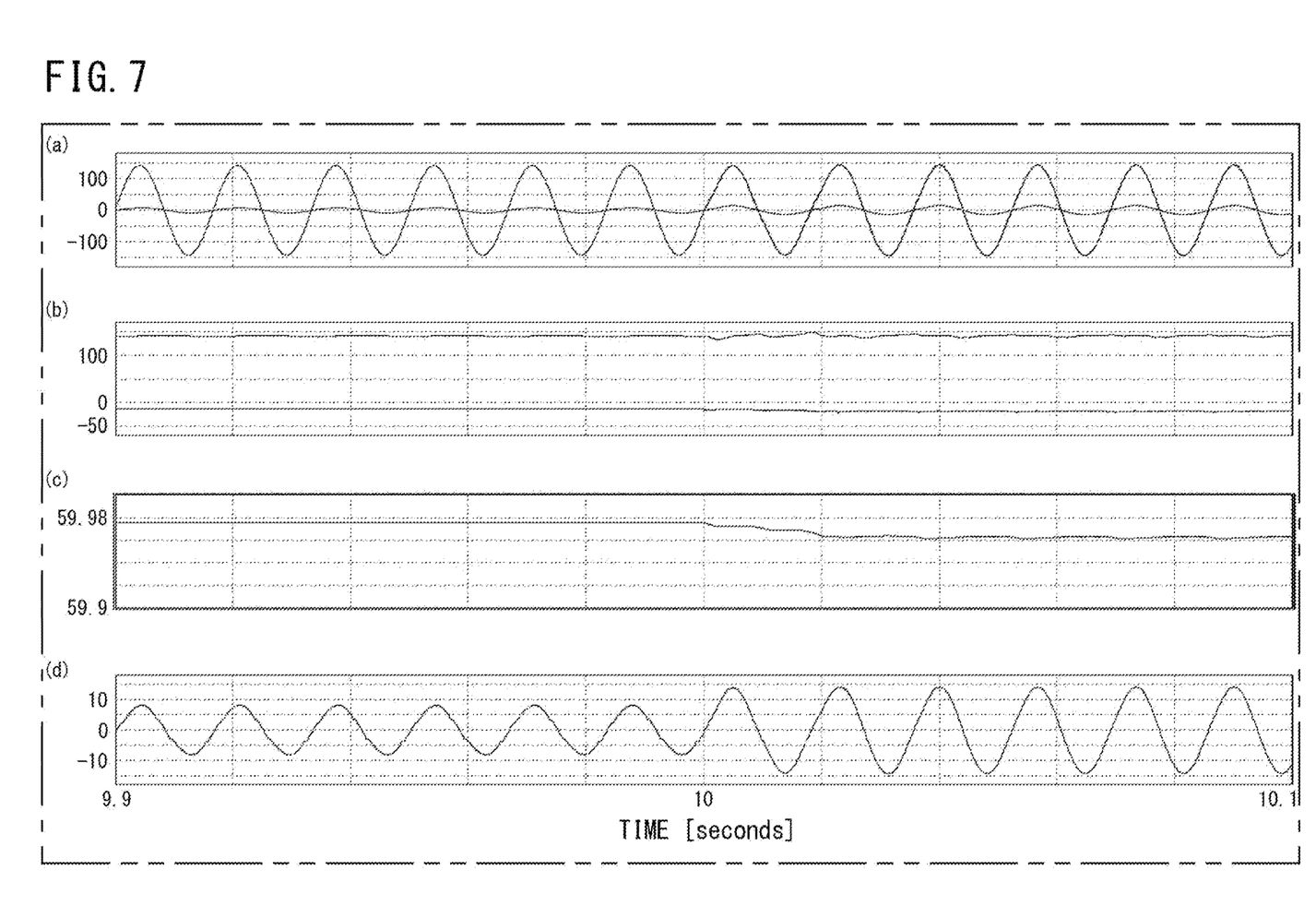
FIG. 7 shows simulation results when the parallel inverter system of FIG. 1 and a power generator of a commercial power grid are operated in parallel.

FIG. 7 is simulation results when parallel inverter system 100 of FIG. 1 and a power generator of a commercial power grid are operated in parallel. The horizontal axis in parts (a), (b), (c), and (d) of FIG. 7 is common and represents time (9.9 to 10.1 seconds). The numerical values on the vertical axis represent voltage, current, or frequency.

Part (a) of FIG. 7 is a waveform diagram showing the alternating-current voltage va and the alternating-current output from the first inverter in an overlapping manner. The larger amplitude is the alternating-current voltage va, and the amplitude oscillating around 0 is the alternating-current. Part (b) of FIG. 7 is a waveform diagram of two phase voltages vd (upper) and vq (lower) after dq transformation. Part (c) of FIG. 7 is the output frequency of the phase locked loop. Part (d) of FIG. 7 is the output current of the first inverter and the second inverter. The power generator is disconnected at time 10 seconds.

As shown in FIG. 7, even when the two inverters and the power generator were connected in parallel to each other, parallel operation was possible, and the output currents of the two inverters were the same. However, the output current contains a DC component of a little over 50% of the effective value, and the power factor decreases to 0.824. No DC component flows through the load, and the alternating-current power source absorbs the DC current component output from the inverter.

The operation of the current command value is provided with a high-pass filter for DC component suppression and a low-pass filter for oscillation suppression. As a result, the DC component is reduced and the power factor is improved to 0.993. When the power generator was disconnected after 10 seconds, the alternating-current voltage va was hardly changed, and the output current of the two inverters increased to compensate for the current borne by the power generator. After the disconnection, the voltage vq and the output frequency of the phase locked loop are slightly reduced, but the two inverters equally bear half of a load current 20A.

In order to control the ratio of the currents borne by the two inverters, the control target value may be changed according to the output of the inverter. When the voltage phase is advanced, the active power increases, and when the voltage amplitude is increased, the reactive power increases. Therefore, as the simplest method, for example, when the voltage command value v* is set to v=E* cos 2πf*t, it is conceivable to provide droop characteristics in which the voltage-amplitude target value E* decreases in accordance with an increase in reactive power and the frequency target value f* decreases in accordance with an increase in active power.

The output phase of the phase locked loop leads the alternating-current voltage as in the synchronous generator, and the phase difference increases in proportion to the output current of the inverter. Multiple inverters of independent output controlled by such a phase locked loop can be operated in parallel with each other. An inverter of independent output controlled by such a phase locked loop can be operated in parallel with another alternating-current power source, and can be handled as a virtual synchronous generator.

SUMMARY

The above disclosure can be generalized and expressed as follows. The controller in each of first inverter (1) and second inverter (2) shown in FIG. 1 adds frequency feedback processing (frequency feedback loop (F)) to an operation of calculating a frequency detection value in a phase locked loop (L) to be executed based on the alternating-current voltage (Va), the frequency feedback processing being processing of adding a frequency correction value (Δf2) obtained by performing a proportional integral operation on a comparison result between a previous value of the frequency detection value and a frequency reference value. In such an inverter, the frequency of the independent output asymptotically approaches the target value and converges. Therefore, when a plurality of such inverters are connected in parallel or connected in parallel with another alternating-current power source, a stable parallel operation can be performed.

More particularly, if the frequency correction value (Δf2) is a second frequency correction value, the controller performs a first operation of obtaining a first frequency correction value (Δf1), based on a deviation between a voltage phase based on a detected output of the voltage sensor (19, 29) and an internal phase in the phase locked loop (L), a second operation of obtaining a new frequency detection value (f) by adding the first frequency correction value (Δf1) and the second frequency correction value (Δf2) to the frequency reference value (fo), and a third operation of generating a control signal for controlling an output of the power converter (1B, 2B), based on the new frequency detection value (f). By performing the second operation described above, it is possible to prevent the frequency of the independent output from not converging.

In addition, the third operation includes obtaining a voltage command value (va*), based on the new frequency detection value (f); and obtaining a voltage correction value (Δva) by performing a proportional operation on a deviation between the voltage command value (va*) and the alternating-current voltage. In this case, by performing the proportional operation instead of the proportional integral operation, it is possible to suppress the cross-current even if there is a difference in the value detected as the alternating-current voltage between the alternating-current power source and another alternating-current power source.

<<Supplement about Forward Conversion (Charging)>>

Although inverters 1 and 2 in FIG. 1 have been described as independent output inverters, when the direct-current voltage source is based on a storage battery, inverters 1 and 2 (power converters 1B and 2B) may perform conversion from alternating-current power to direct-current power. For example, in a possible case, an alternating-current power source (current source) outputting a current synchronized with the voltage of alternating-current circuit 5, as with a grid interconnection type inverter using photovoltaic generation as a power source, is connected to alternating-current circuit 5. In this case, controllers 1A and 2A perform control to convert the alternating-current power of the alternating-current power source into direct-current power to charge the storage battery connected to the direct-current side of power converters 1B and 2B. Surplus power of power consumption in load 6 may be converted (AC→DC) by inverters 1 and 2 to charge the storage batteries included in direct-current voltage sources 3 and 4. Note that, in this case, the internal phase in the phase locked loop of the inverter lags behind the phase of the alternating-current voltage.

<<Others>>

Although full-bridge circuits 10 and 20 shown in FIG. 1 is a two-leg single-phase inverter circuit, the processes shown in FIGS. 2 and 3 can also be applied to a three-leg three-phase inverter circuit.

<<Supplement>>

It should be understood that the embodiments disclosed herein are illustrative in all respects and are not restrictive. The scope of the present invention is defined by the appended claims, and all changes that come within the meaning and range of equivalency of the claims are intended to be embraced therein.

REFERENCE SIGNS LIST 1 first inverter
1A controller
1B power converter
2 second inverter
2A controller
2B power converter
3, 4 direct-current voltage source
5 alternating-current circuit
6 load
10 full-bridge circuit
11, 12, 13, 14 switching element
11d, 12d, 13d, 14d diode
15 alternating-current reactor
16 alternating-current capacitor
17 voltage sensor
18 current sensor
19 voltage sensor
20 full-bridge circuit
21, 22, 23, 24 switching element
21d, 22d, 23d, 24d diode
25 alternating-current reactor
26 alternating-current capacitor
27 voltage sensor
28 current sensor
29 voltage sensor
100 parallel inverter system
B1 phase difference detector
B2 first proportional integrator
B3 adder
B4 integrator
B5 adder
B6 second proportional integrator
B7 voltage commander
B8 adder
B9 proportional operator
B10 PWM signal generator
F frequency feedback loop
L phase locked loop

The invention claimed is:

1. An inverter connected in parallel to an alternating-current circuit to which an alternating-current power source is connected, and configured to provide an independent output to the alternating-current circuit, the inverter comprising:
a power converter configured to convert a direct-current power into an alternating-current power to supply power to the alternating-current circuit;
a voltage sensor configured to detect an alternating-current voltage of the alternating-current circuit; and
a controller configured to control the power converter, wherein
the controller is configured to add frequency feedback processing to an operation of calculating a frequency detection value in a phase locked loop to be executed based on the alternating-current voltage, the frequency feedback processing being processing of adding a frequency correction value obtained by performing a proportional integral operation on a comparison result between a previous value of the frequency detection value and a frequency reference value.

2. The inverter according to claim 1, wherein
the controller is configured to perform, if the frequency correction value is a second frequency correction value,
a first operation of obtaining a first frequency correction value, based on a deviation between a voltage phase based on a detected output of the voltage sensor and an internal phase in the phase locked loop,
a second operation of obtaining a new frequency detection value by adding the first frequency correction value and the second frequency correction value to the frequency reference value, and
a third operation of generating a control signal for controlling an output of the power converter, based on the new frequency detection value.

3. The inverter according to claim 2, wherein the third operation comprises:
obtaining a voltage command value, based on the new frequency detection value; and
obtaining a voltage correction value by performing a proportional operation on a deviation between the voltage command value and the alternating-current voltage.

4. The inverter according to claim 2, wherein
the internal phase has a phase difference with respect to a phase of the alternating-current voltage changing according to an output current of the power converter.

5. The inverter according to claim 1, wherein
the power converter is further capable of converting an alternating-current power into a direct-current power, and
the controller is configured to control the power converter such that the power converter converts an alternating-current power of the alternating-current power source into a direct-current power to charge a direct-current voltage source connected to a direct-current side of the power converter.

6. A parallel inverter system comprising:
a first inverter configured to provide an independent output to an alternating-current circuit; and
a second inverter connected in parallel to the alternating-current circuit together with the first inverter and configured to provide an independent output to the alternating-current circuit, wherein
each of the first inverter and the second inverter comprises:
a power converter configured to convert a direct-current power into an alternating-current power to supply power to the alternating-current circuit;
a voltage sensor configured to detect an alternating-current voltage of the alternating-current circuit; and
a controller configured to control the power converter, and
the controller is configured to add frequency feedback processing to an operation of calculating a frequency detection value in a phase locked loop to be executed based on the alternating-current voltage, the frequency feedback processing being processing of adding a frequency correction value obtained by performing a proportional integral operation on a comparison result between a previous value of the frequency detection value and a frequency reference value.

7. A method of controlling an inverter connected in parallel to an alternating-current circuit to which an alternating-current power source is connected, and configured to provide an independent output to the alternating-current circuit, the method comprising:
converting, by a power converter, a direct-current power into an alternating-current power to supply power to the alternating-current circuit, wherein
a controller configured to control the power converter is configured to add frequency feedback processing to an operation of calculating a frequency detection value in a phase locked loop to be executed based on an alternating-current voltage of the alternating-current circuit, the frequency feedback processing being processing of adding a frequency correction value obtained by performing a proportional integral operation on a comparison result between a previous value of the frequency detection value and a frequency reference value.

* * * * *